(12) United States Patent
Valasek

(10) Patent No.: US 10,423,125 B1
(45) Date of Patent: Sep. 24, 2019

(54) SYSTEMS AND METHODS TO BOOT A COMPUTING SYSTEM OF AN AUTONOMOUS VEHICLE

(71) Applicant: Uber Technologies, Inc., San Francisco, CA (US)

(72) Inventor: Christopher Valasek, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 80 days.

(21) Appl. No.: 15/672,854

(22) Filed: Aug. 9, 2017

(51) Int. Cl.
*G06F 9/00* (2006.01)
*G06F 9/24* (2006.01)
*G05B 11/32* (2006.01)
*G06F 9/4401* (2018.01)

(52) U.S. Cl.
CPC ............ *G05B 11/32* (2013.01); *G06F 9/4401* (2013.01); *B60W 2550/402* (2013.01)

(58) Field of Classification Search
None
See application file for complete search history.

(56) References Cited

U.S. PATENT DOCUMENTS

| 2003/0194094 A1* | 10/2003 | Lampson | G06F 9/4406 380/282 |
| 2007/0032920 A1* | 2/2007 | Dapp | G01C 21/12 701/3 |
| 2011/0016300 A1* | 1/2011 | Lee | G06F 9/4418 713/2 |

\* cited by examiner

*Primary Examiner* — Adam D Tissot
(74) *Attorney, Agent, or Firm* — Dority & Manning, P.A.

(57) ABSTRACT

The present disclosure provides systems and methods to boot a computing system of an autonomous vehicle. In particular, the systems and methods of the present disclosure can initialize a basic input output system (BIOS) of a computing system comprising one or more computing devices of an autonomous vehicle. The computing system can utilize data stored in the BIOS and data stored in one or more files comprising a kernel of an operating system of the autonomous vehicle and a random access memory (RAM) drive to verify the kernel and the RAM drive. Responsive to verifying the kernel and the RAM drive, the operating system of the autonomous vehicle can be booted.

20 Claims, 7 Drawing Sheets

SYSTEMS AND METHODS TO BOOT A COMPUTING SYSTEM OF AN AUTONOMOUS VEHICLE

FIELD

The present disclosure relates generally to autonomous vehicles. More particularly, the present disclosure relates to systems and methods to boot a computing system of an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to boot a computing system of an autonomous vehicle. The method includes initializing, by a computing system comprising one or more computing devices of an autonomous vehicle, a basic input output system (BIOS) of the computing system. The method includes verifying, by the computing system and using data stored in the BIOS of the computing system and data stored in one or more files comprising a kernel of an operating system of the autonomous vehicle and a random access memory (RAM) drive, the kernel and the RAM drive. The method includes, responsive to verifying the kernel and the RAM drive, booting the operating system of the autonomous vehicle.

Another example aspect of the present disclosure is directed to a computing system that includes one or more processors and one or more non-transitory computer-readable media that collectively store instructions that, when executed by the one or more processors, cause the computing system to perform operations. The operations include initializing a BIOS of the computing system. The operations include verifying, using data stored in the BIOS of the computing system and data stored in one or more files comprising a kernel of an operating system of an autonomous vehicle associated with the computing system, the kernel of the operating system of the autonomous vehicle. The operations include, responsive to verifying the kernel, booting the operating system of the autonomous vehicle.

Another example aspect of the present disclosure is directed to one or more non-transitory computer-readable media that collectively store instructions that, when executed by one or more processors, cause a computing system to perform operations. The operations include initializing a BIOS of the computing system. The operations include verifying, using data stored in the BIOS of the computing system and data stored in one or more files comprising a RAM drive and a kernel of an operating system of an autonomous vehicle associated with the computing system, the kernel and the RAM drive. The operations include, responsive to verifying the kernel and the RAM drive, verifying, using data stored in the RAM drive and data stored in one or more files comprising the operating system of the autonomous vehicle, the operating system of the autonomous vehicle. The operations include, responsive to verifying the operating system of the autonomous vehicle, booting the operating system of the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
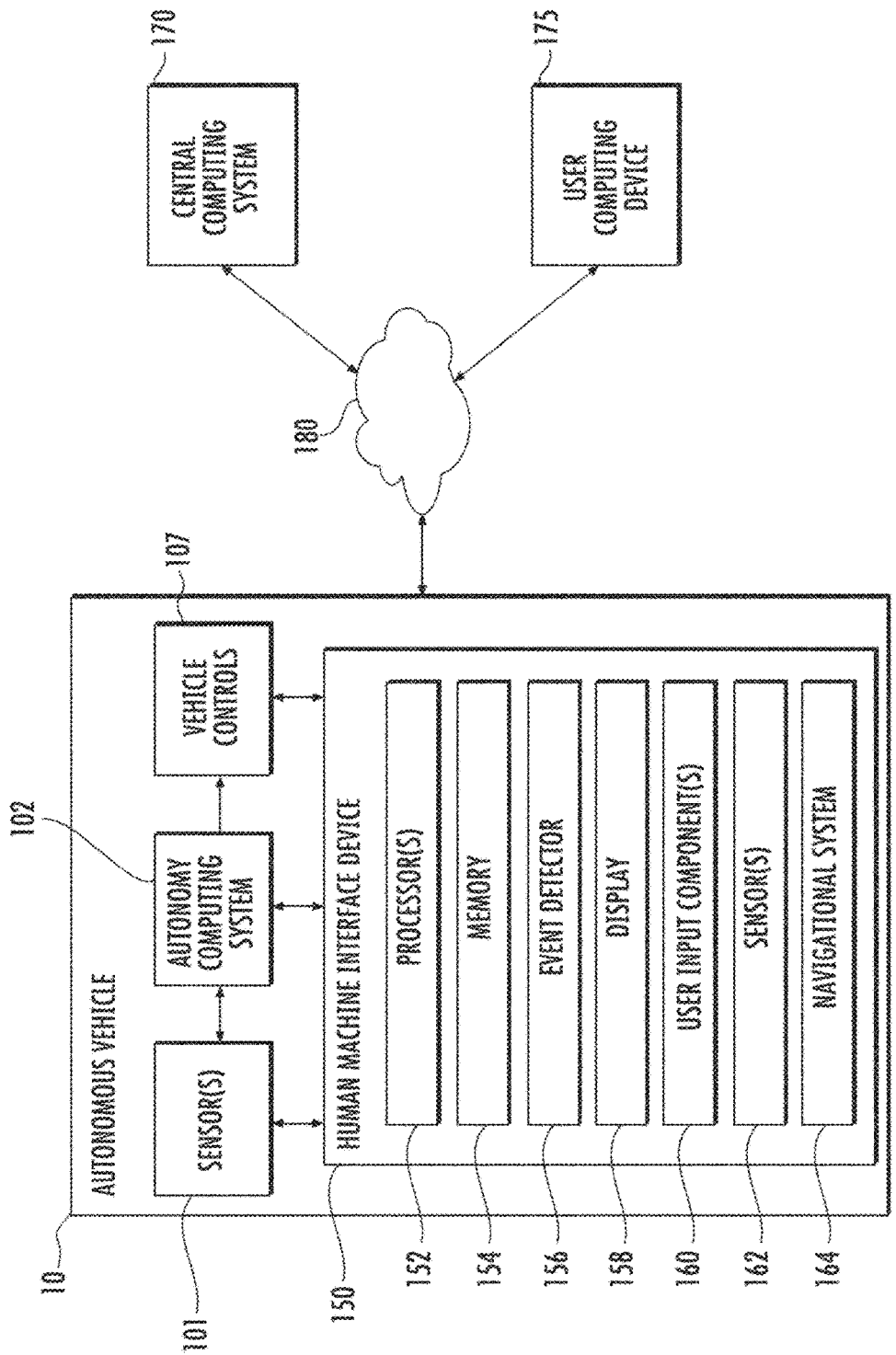
FIG. 1 depicts a block diagram of an example computing system according to example embodiments of the present disclosure.

Generally, the present disclosure is directed to methods and systems for securely booting a computing system of an autonomous vehicle and ensuring that software running on the system is verified. For example, the systems and methods of the present disclosure can verify one or more of a kernel of an operating system of an autonomous vehicle, a random access memory (RAM) drive of an autonomous vehicle, an operating system of an autonomous vehicle, and/or application code configured to control an autonomous vehicle. In particular, in some implementations, a basic input output system (BIOS) of a computing system associated with an autonomous vehicle can be initialized. Utilizing data stored in the BIOS and one or more files comprising a kernel of an operating system of the autonomous vehicle and a RAM drive, the computing system can verify the kernel and the RAM drive. Responsive to verifying the kernel and the RAM drive, the computing system can utilize data stored in the RAM drive and one or more files comprising the operating system of the autonomous vehicle to verify the operating system of the autonomous vehicle. Responsive to verifying the operating system of the autonomous vehicle, the computing system can utilize data stored in the RAM drive and one or more files comprising application code configured to control the autonomous vehicle to verify the application code configured to control the autonomous vehicle.

In some implementations, verifying the kernel and the RAM drive can include determining that a first key of a key pair stored in the BIOS corresponds to a second key of the key pair stored in the one or more files comprising the kernel and the RAM drive. For example, a public portion of a key pair can be stored in the BIOS, a private portion of the key pair can be stored in the one or more files comprising the kernel and the RAM drive, and verifying the kernel and the RAM drive can include determining that the public portion of the key pair stored in the BIOS corresponds to the private portion of the key pair stored in the one or more files comprising the kernel and the RAM drive. Additionally or alternatively, in some implementations, verifying the operating system of the autonomous vehicle can include determining that a first key of a key pair stored in the RAM drive corresponds to a second key of the key pair stored in one or more files comprising the operating system of the autonomous vehicle. For example, a public portion of a key pair can be stored in the RAM drive, a private portion of the key pair can be stored in the one or more files comprising the operating system of the autonomous vehicle, and verifying the operating system of the autonomous vehicle can include determining that the public portion of the key pair stored in the RAM drive corresponds to the private portion of the key pair stored in the one or more files comprising the operating system of the autonomous vehicle. Similarly, in some implementations, verifying the application code configured to control the autonomous vehicle can include determining that a first key of a key pair stored in the RAM drive corresponds to a second key of a key pair stored in one or more files comprising the application code configured to control the autonomous vehicle. For example, a public portion of a key pair can be stored in the RAM drive, a private portion of the key pair can be stored in the one or more files comprising the application code configured to control the autonomous vehicle, and verifying the application code configured to control the autonomous vehicle can include determining that the public portion of the key pair stored in the RAM drive corresponds to the private portion of the key pair stored in the one or more files comprising the application code configured to control the autonomous vehicle.

In some implementations, one or more files comprising the operating system of the autonomous vehicle can include one or more compressed files comprising the application code configured to control the autonomous vehicle. In such implementations, responsive to verifying the operating system of the autonomous vehicle, the computing system can decompress the one or more compressed files comprising the application code configured to control the autonomous vehicle.

The systems and methods described herein can provide a number of technical effects and benefits. For example, the systems and methods described herein can allow an operator of an autonomous vehicle to ensure only code authorized by the operator (e.g., an authorized operating system and/or authorized application code configured to control the autonomous vehicle) is loaded and executed by the computing system.

With reference now to the Figures, example embodiments of the present disclosure will be discussed in further detail.

FIG. 1 depicts a block diagram of an example computing system according to example embodiments of the present disclosure. The example computing system includes an autonomous vehicle 10, a central computing system 170, and a user computing device 175 that are communicatively coupled over one or more communication networks 180. The autonomous vehicle 10 can include one or more sensors 101, an autonomy computing system 102, one or more vehicle controls 107, and a human machine interface device 150.

The human machine interface device 150 can enable communication, control, and/or other interface actions to occur between the autonomous vehicle 10 and a human (e.g., a passenger located within the autonomous vehicle 10). The human machine interface device 150 can be communicatively coupled to the autonomy computing system 102 to enable exchange of data, instructions, and/or requests between the system 102 and the device 150.

The human machine interface device 150 can include or be implemented by one or more computing devices that are operatively connected. The human machine interface device 150 can be an embedded computing device or a stand-alone computing device. In one particular example, the human machine interface device 150 can be a tablet computing device that is positioned within the autonomous vehicle 10 (e.g., within a rear seat area of the autonomous vehicle 10).

The human machine interface device 150 can include one or more processors 152, memory 154, event detector 156, display 158, one or more user input components 160, one or more sensors 162, and navigational system 164. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage media, such as RAM, ROM, EEPROM, EPROM, one or more memory devices, flash memory devices, etc., and combinations thereof.

The memory 154 can store information that can be accessed by the one or more processors 152. For instance, the memory 154 (e.g., one or more non-transitory computer-readable storage mediums, memory devices) can store data that can be obtained, received, accessed, written, manipulated, created, and/or stored. The memory 154 can also store computer-readable instructions that can be executed by the one or more processors 152. The instructions can be software written in any suitable programming language or can be implemented in hardware. Additionally, or alternatively, the instructions can be executed in logically and/or virtually separate threads on processor(s) 152. For example, the memory 154 can store instructions that when executed by the one or more processors 152 cause the one or more processors 152 to perform any of the operations and/or functions described herein.

In some implementations, the human machine interface device 150 can include a display device 158 (e.g., a touch-sensitive display device) and/or other input/output components 160 that provide an interactive user interface. For example, the display device 158 can be a rear-seat display device that is accessible by a passenger that is located in a rear seat of the autonomous vehicle.

In some implementations, in addition or alternatively to the human machine interface device 150, the systems and methods of the present disclosure can include or leverage a user computing device 175 that is associated with the passenger. For example, in some implementations, in addition or alternatively to the display of the user interface by the human machine interface device 150, the interactive user interface can be provided on or accessible via a display of the user computing device 175. The user computing device 175 can be communicatively connected to the human machine interface device 150 via a local area network such as a short range wireless connection (e.g., a Bluetooth, ZigBee, NFC, infrared, etc.) or other forms of connections (e.g., hardwiring). As examples, the user computing device 175 can be a smartphone, tablet computing device, wearable computing device, portable gaming device, hand-held display screen, or other forms of computing devices.

In yet further implementations, certain operations described herein can be performed by a central computing system 170 that is remotely located to the autonomous vehicle 10 and in communication with the autonomous vehicle over one or more wireless networks 180 (e.g., cellular data networks, satellite communication networks, wide area networks, etc.). As an example, the central computing system 170 can include one or more server computing devices. In the event that plural server computing devices are used, the server computing devices can be arranged according to a parallel computing architecture, a sequential computing architecture, or combinations thereof. In some implementations, the central computing system 170 can provide control, monitoring, management, and/or other functionality for a fleet of autonomous vehicles 10.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 2A:
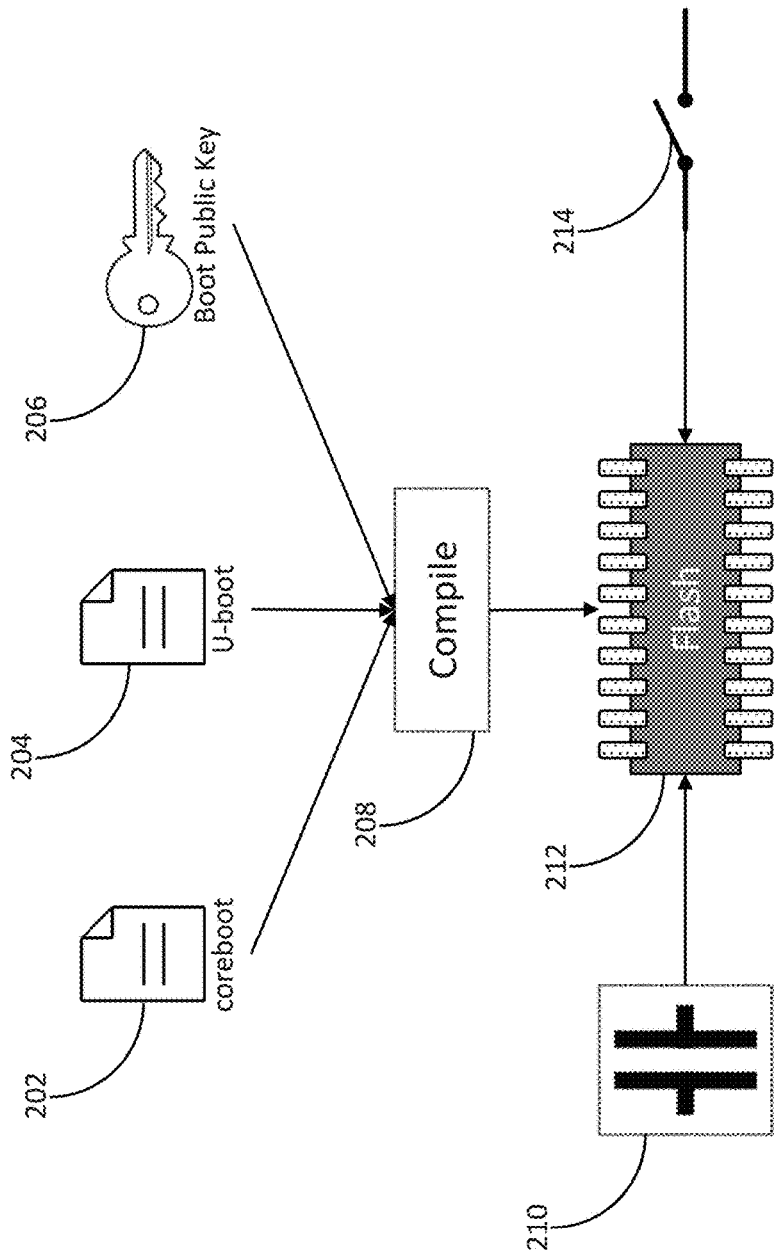
FIG. 2A depicts an example process to create a basic input output system (BIOS) according to example embodiments of the present disclosure.

FIG. 2A depicts an example process to create a basic input output system (BIOS) according to example embodiments of the present disclosure. Referring to FIG. 2A, one or more computing devices of autonomous vehicle 10 can include a memory for storing a basic input output system (BIOS). For example, autonomy computing system 102 can include memory 212. Memory 212 can be associated with a jumper and/or dip switch that can configure whether or not memory 212 is writable. For example, jumper 210 and/or dip switch 214 can configure whether or not memory 212 is writable. Coreboot file 202 can include instructions configured to cause the computing device(s) of autonomous vehicle 10 to perform one or more tasks associated with loading and running an operating system of autonomous vehicle 10. Boot loader file 204 can include instructions configured to cause the computing device(s) of autonomous vehicle 10 to place an operating system of autonomous vehicle 10 (or portions thereof) in memory. In accordance with embodiments of the disclosure, coreboot file 202, boot loader file 204, and key 206 of a key pair (e.g., a public portion of a key pair) can be compiled in operation 208 to create a BIOS, and the resulting BIOS can be stored in memory 212, which can include configuring one or more of jumper 210 and/or dip switch 214 such that memory 212 is writable.

Figure 2B:
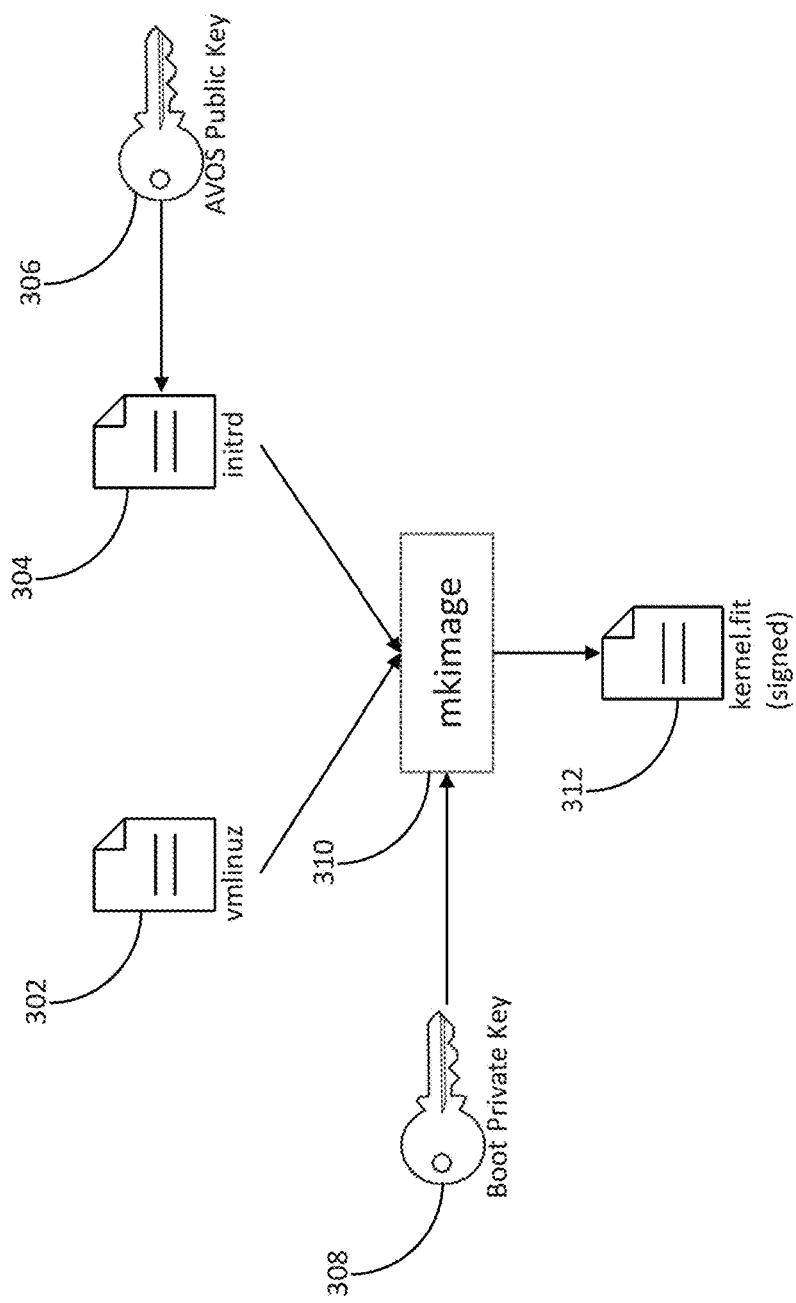
FIG. 2B depicts an example process to create a kernel and random access memory (RAM) drive according to example embodiments of the present disclosure.

FIG. 2B depicts an example process to create a kernel and random access memory (RAM) drive according to example embodiments of the present disclosure. Referring to FIG. 2B, autonomy computing system 102 can utilize an operating system and random access memory (RAM) drive. For example, kernel 302 can be a kernel of an operating system for autonomy computing system 102 and RAM drive 304 can be a RAM drive for autonomy computing system 102. RAM drive 304 can be configured to include key 306 of a key pair (e.g., a public portion of a key pair). In accordance with embodiments of the disclosure, operation 310 can combine kernel 302 and RAM drive 304 with a key of the key pair compiled in operation 208 (e.g., a private portion of the key pair) to create signed kernel file 312.

Figure 2C:
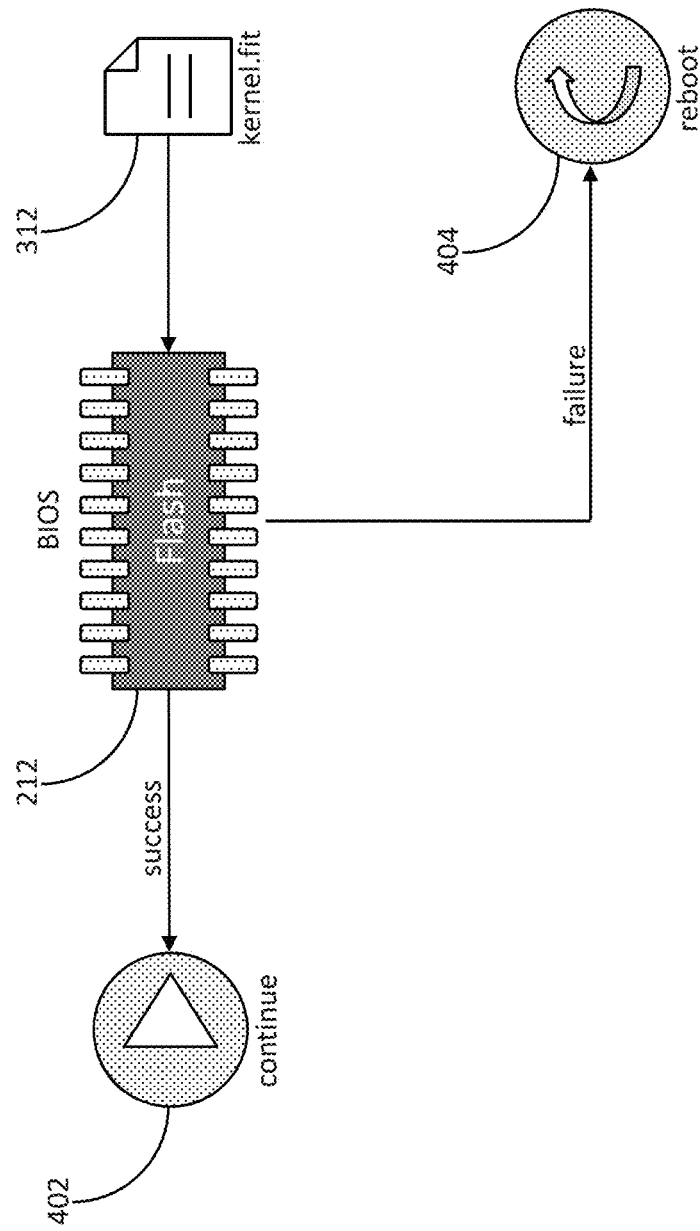
FIG. 2C depicts an example process to verify a kernel and RAM drive according to example embodiments of the present disclosure.

FIG. 2C depicts an example process to verify a kernel and RAM drive according to example embodiments of the present disclosure. Referring to FIG. 2C, as indicated above, autonomy computing system 102 can include memory 212, which can store the BIOS created in operation 208, including key 206. Signed kernel file 312 can include key 308. Autonomy computing system 102 can initialize the BIOS stored in memory 212. Upon initialization, autonomy computing system 102 can verify kernel 302 and RAM drive 304 by determining whether key 206 corresponds to key 308. Responsive to verifying kernel 302 and RAM drive 304 (e.g., determining that key 206 corresponds to key 308), the boot process of autonomy computing system 102 can continue at (402). Otherwise (e.g., in response to determining that key 206 does not correspond to key 308), autonomy computing system 102 can abort the boot process and restart one or more computing devices of autonomous vehicle 10 (e.g., autonomy computing system 102) at (404).

Figure 2D:
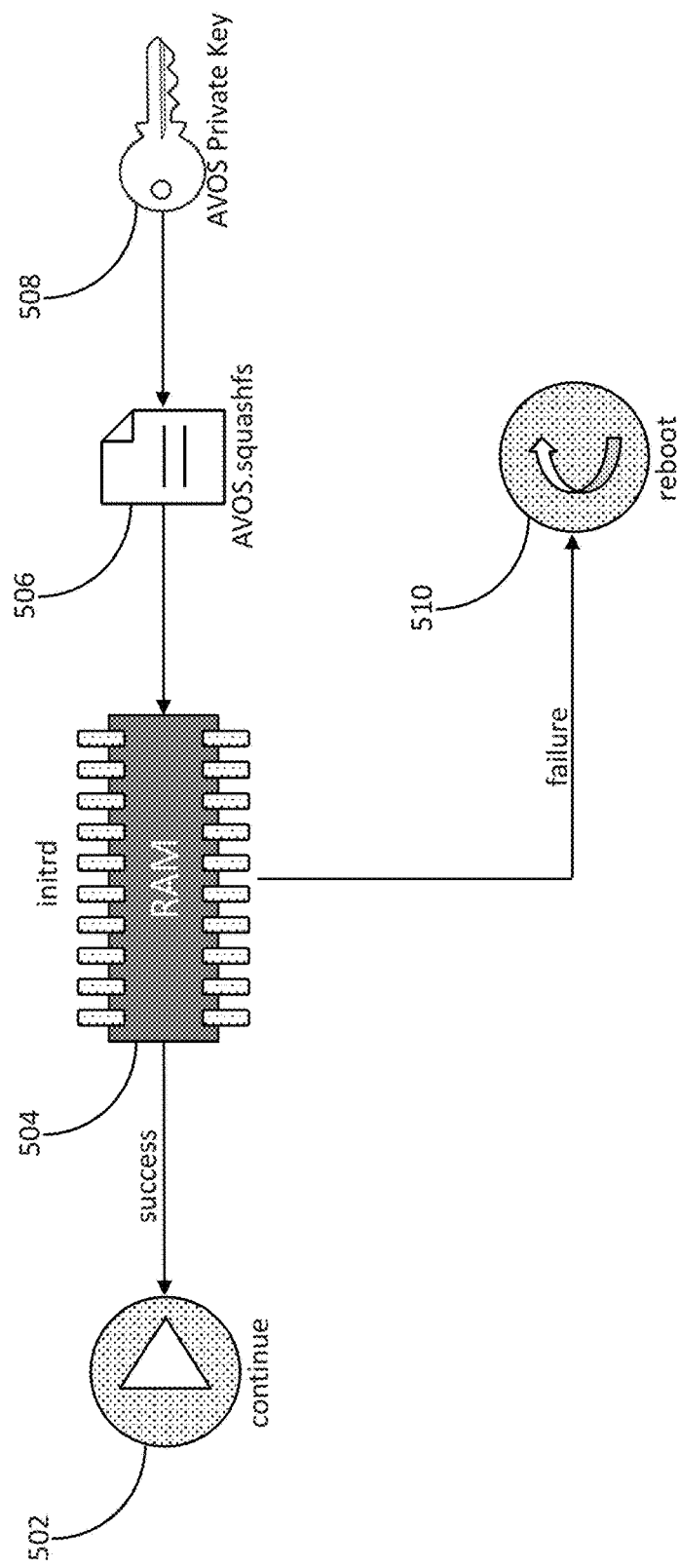
FIG. 2D depicts an example process to verify an operating system of an autonomous vehicle according to example embodiments of the present disclosure.

FIG. 2D depicts an example process to verify an operating system of an autonomous vehicle according to example embodiments of the present disclosure. Referring to FIG. 2D, autonomy computing system 102 can include memory 504 (e.g., random access memory (RAM)). Responsive to initializing the BIOS stored in memory 212, RAM drive 304 may be loaded into memory 504, including key 306 (e.g., a public portion of a key pair). File 506 may include an operating system of autonomy computing system 102. For example, in some implementations, file 506 can be a compressed file comprising an operating system of autonomy computing system 102 and application code configured to control autonomous vehicle 10. File 506 can also include key 508 (e.g., a private portion of a key pair), which can be part of a key pair corresponding to key 306. Responsive to verifying kernel 302 and RAM drive 304 (e.g., subsequent to (402)), autonomy computing system 102 can verify an operating system of autonomy computing system 102. For example, autonomy computing system 102 can verify the operating system included in file 506 by determining whether key 508 corresponds to key 306. Responsive to verifying the operating system included in file 506 (e.g., determining that key 508 corresponds to key 306), the boot process of autonomy computing system 102 can continue at (502). Otherwise (e.g., in response to determining that key 508 does not correspond to key 306), autonomy computing system 102 can abort the boot process and restart one or more computing devices of autonomous vehicle 10 (e.g., autonomy computing system 102) at (510).

Figure 2E:
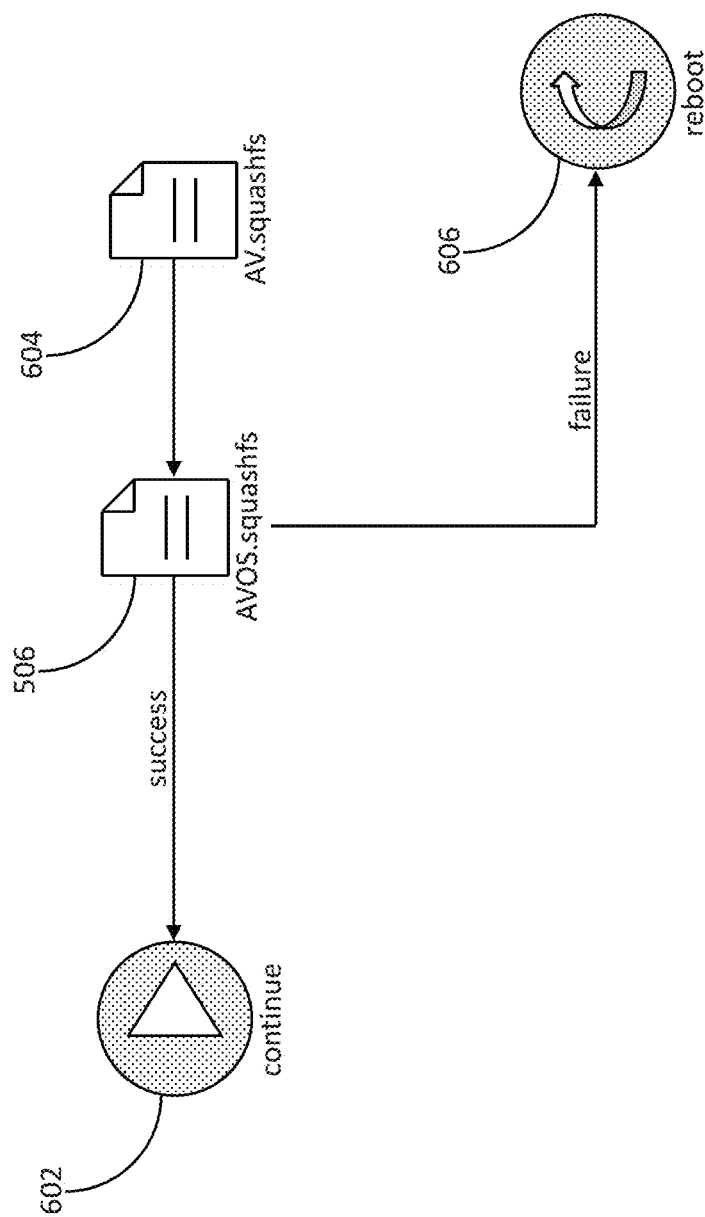
FIG. 2E depicts an example process to verify application code of an autonomous vehicle according to example embodiments of the present disclosure.

FIG. 2E depicts an example process to verify application code of an autonomous vehicle according to example embodiments of the present disclosure. Referring to FIG. 2E, as indicated above, file 506 may include application code 604 configured to control autonomous vehicle 10. Responsive to verifying kernel 302 and RAM drive 304 (e.g., subsequent to (402)), autonomy computing system 102 can verify application code 604 by determining whether key 508 corresponds to key 306. Responsive to verifying application code 604 (e.g., determining that key 508 corresponds to key 306), the boot process of autonomy computing system 102 can continue at (602). Otherwise (e.g., in response to determining that key 508 does not correspond to key 306), autonomy computing system 102 can abort the boot process and restart one or more computing devices of autonomous vehicle 10 (e.g., autonomy computing system 102) at (606). As indicated above, in some implementations, file 506 may be a compressed file comprising an operating system of autonomy computing system 102 and application code 604. In such implementations, responsive to verifying the operating system included in file 506 and/or application code 604 (e.g., determining that key 508 corresponds to key 306), autonomy computing system 102 can decompress file 506.

Figure 3:
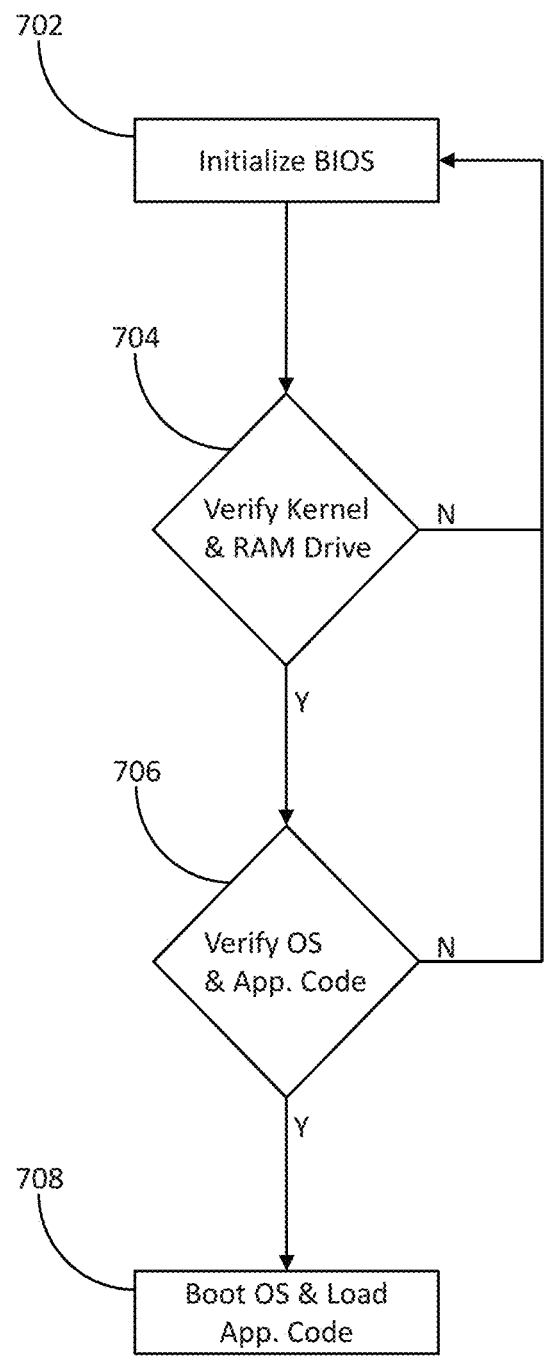
FIG. 3 depicts a flow chart diagram of an example method to boot a computing system of an autonomous vehicle according to example embodiments of the present disclosure.

FIG. 3 depicts a flow chart diagram of an example method to boot a computing system of an autonomous vehicle according to example embodiments of the present disclosure. Referring to FIG. 3, at (702), a BIOS of a computing system of an autonomous vehicle can be initialized. For example, autonomy computing system 102 can initialize the BIOS stored in memory 212. At (704), a determination can be made as to whether a kernel of an operating system of the computing system and a RAM drive can be verified. For example, a determination can be made as whether kernel 302 and RAM drive 304 can be verified (e.g., a determination can be made as to whether key 206 corresponds to key 308). Responsive to determining that the kernel and the RAM drive can be verified, at (706), a determination can be made as to whether an operating system of the autonomous vehicle and application code configured to control the autonomous vehicle can be verified. For example, a determination can be made as whether file 506 can be verified (e.g., a determination can be made as to whether key 306 corresponds to key 508). Responsive to determining that the operating system and the application code can be verified, at (708), the operating system can be booted and the application code loaded. For example, responsive to determining that file 506 can be verified, the operating system included in file 506 can be booted and application code 604 can be loaded. Returning to (704), responsive to determining that the kernel and the RAM drive cannot be verified, the process can return to (702), and the BIOS can be reinitialized (e.g., autonomy computing system 102 can be rebooted). Similarly, returning to (706), responsive to determining that the operating system and the application code cannot be verified, the process can return to (702), and the BIOS can be reinitialized (e.g., autonomy computing system 102 can be rebooted).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to boot a computing system of an autonomous vehicle, the method comprising:
   initializing, by a computing system comprising one or more computing devices of an autonomous vehicle, a basic input output system (BIOS) of the computing system;
   verifying, by the computing system and using data stored in the BIOS of the computing system and data stored in one or more files comprising a kernel of an operating system of the autonomous vehicle and a random access memory (RAM) drive, the kernel and the RAM drive; and
   responsive to verifying the kernel and the RAM drive, booting the operating system of the autonomous vehicle.

2. The computer-implemented method of claim 1, wherein verifying the kernel and the RAM drive comprises determining that a first key of a key pair stored in the BIOS of the computing system corresponds to a second key of the key pair stored in the one or more files comprising the kernel and the RAM drive.

3. The computer-implemented method of claim 1, further comprising, responsive to verifying the kernel and the RAM drive, verifying, by the computing system and using data stored in the RAM drive and data stored in one or more files comprising the operating system of the autonomous vehicle, the operating system of the autonomous vehicle.

4. The computer-implemented method of claim 3, wherein verifying the operating system of the autonomous vehicle comprises determining that a first key of a key pair stored in the RAM drive corresponds to a second key of the key pair stored in the one or more files comprising the operating system of the autonomous vehicle.

5. The computer-implemented method of claim 3, further comprising, responsive to verifying the operating system of the autonomous vehicle, verifying, by the computing system and using data stored in the RAM drive and data stored in one or more files comprising application code configured to control the autonomous vehicle, the application code configured to control the autonomous vehicle.

6. The computer-implemented method of claim 5, wherein verifying the application code configured to control the autonomous vehicle comprises determining that a first key of a second key pair stored in the RAM drive corresponds to a second key of the second key pair stored in the one or more files comprising the application code configured to control the autonomous vehicle.

7. The computer-implemented method of claim 5, wherein the one or more files comprising the operating system of the autonomous vehicle comprise one or more compressed files comprising the operating system of the autonomous vehicle and the application code configured to control the autonomous vehicle.

8. The computer-implemented method of claim 7, further comprising, responsive to verifying the operating system of the autonomous vehicle, decompressing, by the computing system, the one or more compressed files comprising the operating system of the autonomous vehicle and the application code configured to control the autonomous vehicle.

9. A computing system comprising:
   one or more processors; and one or more non-transitory computer-readable media that collectively store instructions that, when executed by the one or more processors, cause the computing system to perform operations, the operations comprising:
initializing a basic input output system (BIOS) of the computing system;
verifying, using data stored in the BIOS of the computing system and data stored in one or more files comprising a kernel of an operating system of an autonomous vehicle associated with the computing system, the kernel of the operating system of the autonomous vehicle; and
responsive to verifying the kernel, booting the operating system of the autonomous vehicle.

10. The computing system of claim 9, wherein verifying the kernel comprises determining that a first key of a key pair stored in the BIOS of the computing system corresponds to a second key of the key pair stored in the one or more files comprising the kernel.

11. The computing system of claim 9, wherein the one or more files comprising the kernel comprise a random access memory (RAM) drive, and wherein the operations further comprise, responsive to verifying the kernel, verifying, using data stored in the RAM drive and data stored in one or more files comprising the operating system of the autonomous vehicle, the operating system of the autonomous vehicle.

12. The computing system of claim 11, wherein verifying the operating system of the autonomous vehicle comprises determining that a first key of a key pair stored in the RAM drive corresponds to a second key of the key pair stored in the one or more files comprising the operating system of the autonomous vehicle.

13. The computing system of claim 12, wherein the operations further comprise, responsive to verifying the operating system of the autonomous vehicle, verifying, using data stored in the RAM drive and data stored in one or more files comprising application code configured to control the autonomous vehicle, the application code configured to control the autonomous vehicle.

14. The computing system of claim 13, wherein verifying the application code configured to control the autonomous vehicle comprises determining that a first key of a second key pair stored in the RAM drive corresponds to a second key of the second key pair stored in the one or more files comprising the application code configured to control the autonomous vehicle.

15. The computing system of claim 13, wherein the one or more files comprising the operating system of the autonomous vehicle comprise one or more compressed files comprising the operating system of the autonomous vehicle and the application code configured to control the autonomous vehicle.

16. The computing system of claim 15, wherein the operations further comprise, responsive to verifying the operating system of the autonomous vehicle, decompressing the one or more compressed files comprising the operating system of the autonomous vehicle and the application code configured to control the autonomous vehicle.

17. One or more non-transitory computer-readable media that collectively store instructions that, when executed by one or more processors, cause a computing system to perform operations, the operations comprising:
initializing a basic input output system (BIOS) of the computing system;
verifying, using data stored in the BIOS of the computing system and data stored in one or more files comprising a random access memory (RAM) drive and a kernel of an operating system of an autonomous vehicle associated with the computing system, the kernel and the RAM drive;
responsive to verifying the kernel and the RAM drive, verifying, using data stored in the RAM drive and data stored in one or more files comprising the operating system of the autonomous vehicle, the operating system of the autonomous vehicle; and
responsive to verifying the operating system of the autonomous vehicle, booting the operating system of the autonomous vehicle.

18. The one or more non-transitory computer-readable media of claim 17, wherein verifying the kernel and the RAM drive comprises determining that a first key of a key pair stored in the BIOS of the computing system corresponds to a second key of the key pair stored in the one or more files comprising the RAM drive and the kernel.

19. The one or more non-transitory computer-readable media of claim 17, wherein verifying the operating system of the autonomous vehicle comprises determining that a first key of a key pair stored in the RAM drive corresponds to a second key of the key pair stored in the one or more files comprising the operating system of the autonomous vehicle.

20. The one or more non-transitory computer-readable media of claim 17, wherein the operations further comprise, responsive to verifying the operating system of the autonomous vehicle, verifying, using data stored in the RAM drive and data stored in one or more files comprising application code configured to control the autonomous vehicle, the application code configured to control the autonomous vehicle.

* * * * *